Nov. 7, 1950     L. DE FLOREZ ET AL     2,528,502
WIND DRIFT EQUIPMENT

Filed Jan. 27, 1945     3 Sheets-Sheet 1

Inventor
Luis de Florez
Edwin K. Smith
and George W. Hoover
By
J. E. Bush
Attorney Nov. 7, 1950    L. DE FLOREZ ET AL    2,528,502
WIND DRIFT EQUIPMENT Filed Jan. 27, 1945    3 Sheets-Sheet 2

Inventor
Luis de Florez
Edwin K. Smith
and George W. Hoover

By
J. E. Bush
Attorney

Nov. 7, 1950     L. DE FLOREZ ET AL     2,528,502
WIND DRIFT EQUIPMENT

Filed Jan. 27, 1945     3 Sheets-Sheet 3

Inventor
Luis de Florez
Edwin K. Smith
& George W. Hoover

By M. A. Hayes

Attorney

Patented Nov. 7, 1950

2,528,502

UNITED STATES PATENT OFFICE 2,528,502

WIND DRIFT EQUIPMENT

Luis de Florez, Edwin K. Smith, and George W. Hoover, United States Navy

Application January 27, 1945, Serial No. 574,938

10 Claims. (Cl. 35—10.2)

(Granted under the act of March 3, 1883, as amended April 30, 1928; 370 O. G. 757)

This invention relates to vehicles used for synthetic training in air navigation. These vehicles are of the general type described in U. S. Patents Nos. 2,301,685 and 2,312,962, dated 10 November 1942 and 2 March 1943, respectively.

One of the principal objects of the invention is to introduce the effects of wind into any problem to be solved with such vehicles or carts so as to reproduce the conditions encountered in actual flight in a reasonably accurate manner.

A further object is to provide means in a cart of the above type for driving the cart along a path representing the track and ground speed of the airplane, while the instruments indicate the corresponding heading and air speed thereof in accordance with an assumed wind speed and direction for which the means is set.

Other and more specific objects of the present invention will appear as its description proceeds, having reference to the accompanying drawings, wherein.

Figure 3:
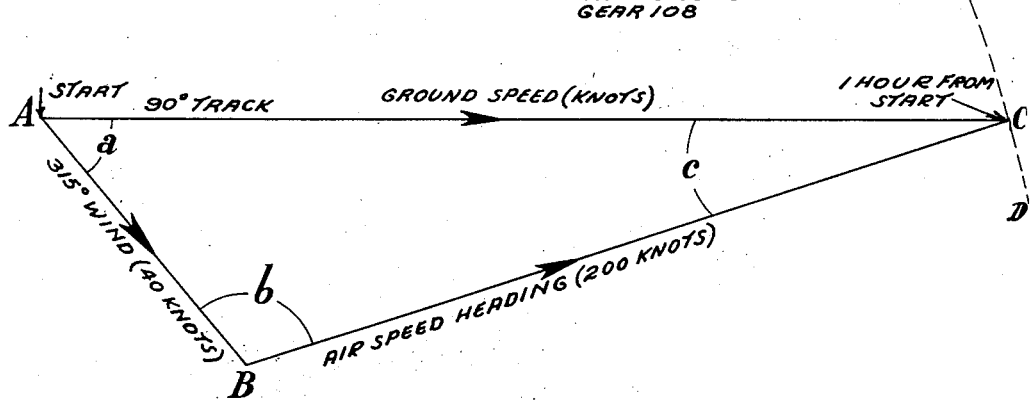
Fig. 3 is a triangle representing the relations between the wind speed and direction, airplane speed and heading and its ground speed and track.

As is well known among pilots and navigators, allowance must be made for the speed and direction of wind in plotting a course in order to maintain such heading as will achieve a certain destination at a given time. Given the speed and direction of the wind, the air speed at which the flight will be made and the destination, it is relatively simple by graphical methods to determine the ground speed and heading. Referring to Fig. 3, for example, with a 40 knot wind from 315°, an air speed of 200 knots and a destination having a bearing of 90°, a diagram will be plotted by drawing a wind vector AB, from B as a center striking an arc D having a radius corresponding to an air speed of 200 knots, drawing a line AC from A having a bearing of 90° to intersect the arc D, and then connecting the points B and C. In this diagram AB is the wind vector, BC represents the air speed and heading, and AC the ground speed and track. It will be apparent from this diagram that the heading and ground speed will change each time the course is changed, requiring constant vigilance and careful plotting to maintain a plane on a predetermined route and schedule.

In the case of an actual airplane when not flying exactly with or against the wind, the wind drift or "crabbing" effect necessitates that the course be so selected that the joint effects of the wind and engine cause the plane to proceed in a direction differing from that in which it is pointed. These conditions are simulated by the device constituting the present invention.

Figure 1:
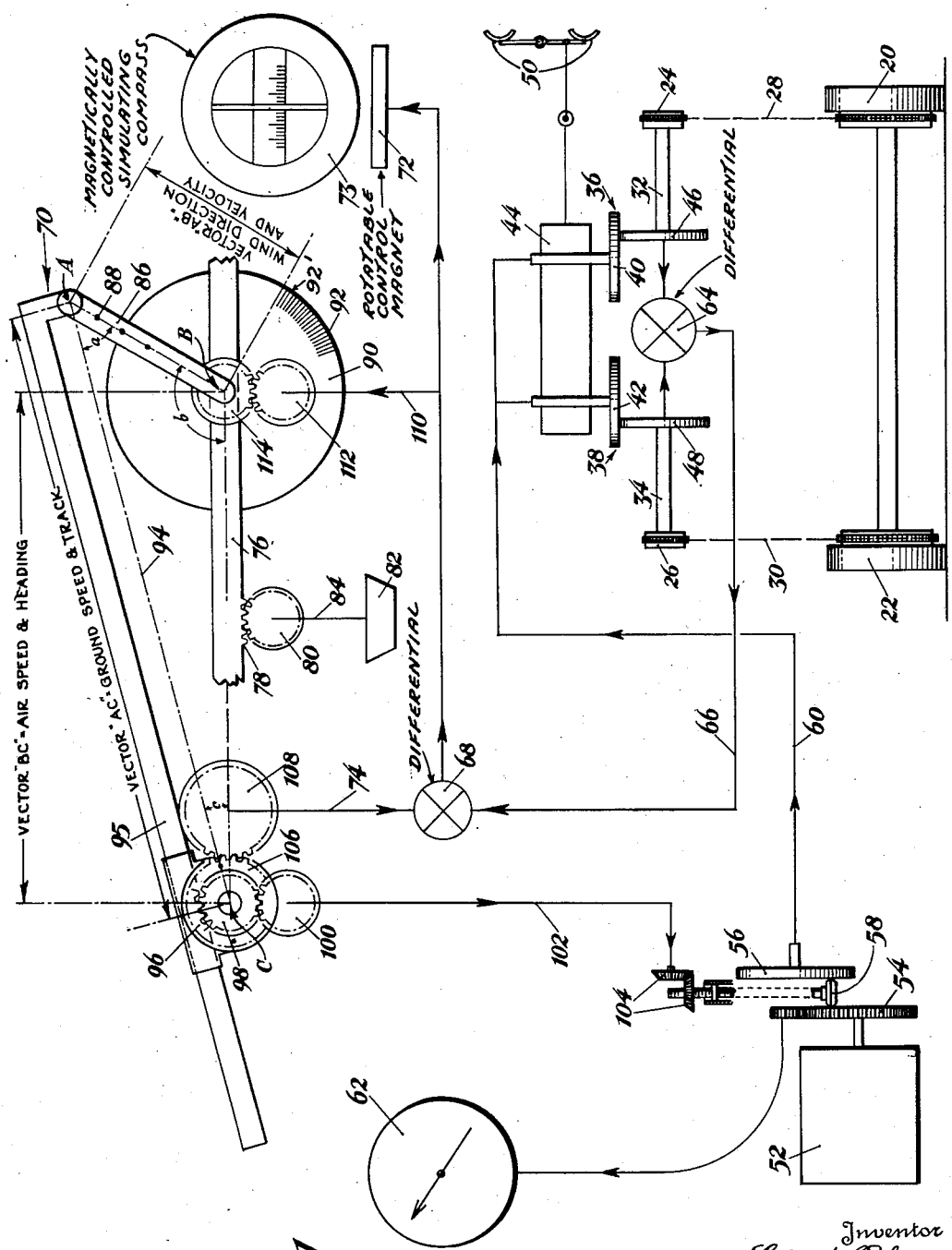
Fig. 1 represents the general layout of the mechanism in diagrammatic form.

The invention is depicted diagrammatically in the drawing in Fig. 1. As shown in this drawing, the cart is provided with drive wheels 20 and 22, which are driven by the sprockets 24 and 26, through chains 28 and 30, all respectively. Various forms of reduction gearing may be employed in the event that direct drive fails to produce the desired ratios of speed or power.

The sprockets 24 and 26 are mounted on shafts 32 and 34 which are driven by infinitely variable transmissions of the friction disk type denoted 36 and 38 respectively. The driving disks 40 and 42 of these transmissions are supported in a suitably shiftable block 44 so that their positions, with respect to their respective driven disks 46 and 48 can be shifted by operation of the rudder pedals 50 interconnected with the block 44 through suitable linkages. Thus, it will be seen that the relative speeds of rotation of the wheels 20 and 22 can be changed over a wide range to effect either uniform forward motion or sharp turning in either direction.

The power input for the driving disks 40 and 42 is derived from a motor 52 which, through an infinitely variable speed transmission comprising for example, a friction driving disk 54, a friction driven disk 56 and an intermediate transmitting element 58, transmits power by means of suitable connections 60 to the friction drive discs 40 and 42. Directly coupled with the driving motor 52, is a tachometer 62, which is calibrated to read in units of air speed for purposes of this training device, corresponding to an air speed indicator of an actual airplane.

When the disks 46 and 48 are driven at different speed, their relative movement will produce movement in a differential 64 which is interposed between these two disks. Such differential movement is transmitted through a shaft or other suitable drive connections 66 to a correcting differential 68. Since the output of the differential 64 is a function of the change in position of the longitudinal axis of the trainer, it will follow that the drive connections 66 may be made to receive a degree of movement which renders its rotative position substantially predetermined with respect to direction of the cart and that such unmodified movement as might be imparted by this shafting to another element would similarly impart a position to that element which would maintain it in a predetermined relation with respect to direction in space. For reasons to be ascribed later in this discussion, it is not desired to maintain any element exactly fixed with respect to space, since it is necessary to introduce a small correction for such condition. For this reason the drive connections 66 from the first differential 64 are connected through the second differential 68 for controlling the characteristics of the wind triangle 70 whose angles are designated by the letters a, b and c and for adjusting the position of a magnet 72 which determines the bearing indicated by a simulated magnetic compass 73.

The output of the differential 68 is affected not only by its input from connections 66 but further by a modifying influence imparted through connections 74 as a function of changes in the angle c of the wind triangle.

The structure forming the wind triangle 70, the vertices of which are represented by the letters A, B and C affords a continuous mechanical solution of the wind triangle ABC discussed in the introductory portion of this description. The leg BC denoted 76, represents the vector of the airplane represented by the trainer, which corresponds with the heading and air speed of the airplane. The length of this leg is manually set at the start of a problem by a suitable means, illustrated for example as a rack 78 and pinion 80 operated by a hand wheel 82 through a shaft 84. The direction of the leg 76 remains fixed in that it is always parallel to the fore and aft axis of the trainer. Pivotally related with the leg 76 is the leg AB, denoted 86 and further identified as the wind vector. The length and direction of the leg 86 are manually set at the beginning of a problem to correspond with the assumed speed and direction of the wind. The length may be modified in any suitable manner, one example utilizing a pin carried by the leg AC for selective insertion into apertures 88 formed in the leg 86. The direction of the leg 86 may be set by manipulation of a dial 90 which is shown as bearing calibrations 92 with indicator 92' to assist in setting up any particular bearing.

Now, coming to the third leg 94 of the triangle which corresponds with the ground speed and track vector of the airplane, we find its corresponding link 95 slightly offset for mechanical reasons. One end of the link is pivoted to the wind vector leg 86 and its opposite end is provided with rack teeth 96 for engaging a pinion 98 which is engaged with a pinion 100 through which movement is imparted to connections 102 and beveled gears 104 to shift the element 58 for changing the ratio of the transmission 54—56. Returning to the triangle itself, it will be seen that if the angle between the sides AC and BC is changed, a pinion 106, fixed against rotation with respect to the link 95 will cause rotation of a pinion 108 with which it is engaged. It is this change in the angle ACB and its effect upon the pinion 108 that is introduced through the connections 74 to the differential 68 for making the correction already referred to. As previously stated, the output of the differential 68 modifies the reading of the magnetic compass 73 and at the same time, through connections 110 and pinion 112, drives a pinion 114 to impart angular movement to the leg 86 representing the wind vector. The length of the link 95 is modified accordingly to correspond with the effects of change of heading of an airplane.

In an actual plane, it will be recognized that the fore and aft axis of the plane, defining a direction known as heading, will correspond with the instantaneous corrected compass reading. In actual flying, this heading or compass reading will not correspond with the ground track because of what has already been described as "crabbing." In the present trainer, since there is no provision for the reproduction of a crabbing effect, it must be simulated. This simulation is effected by modifying the compass itself so that it indicates a direction which is different from the fore and aft axis of the trainer. The difference between the compass indication and the fore and aft axis of the trainer is a varying difference depending upon the constants of the particular problem under consideration. Hence, the magnet 72 whose position determines the compass indication has been connected with the differential 68 from which it derives its position as a function of the constants thus assumed.

Figure 2:
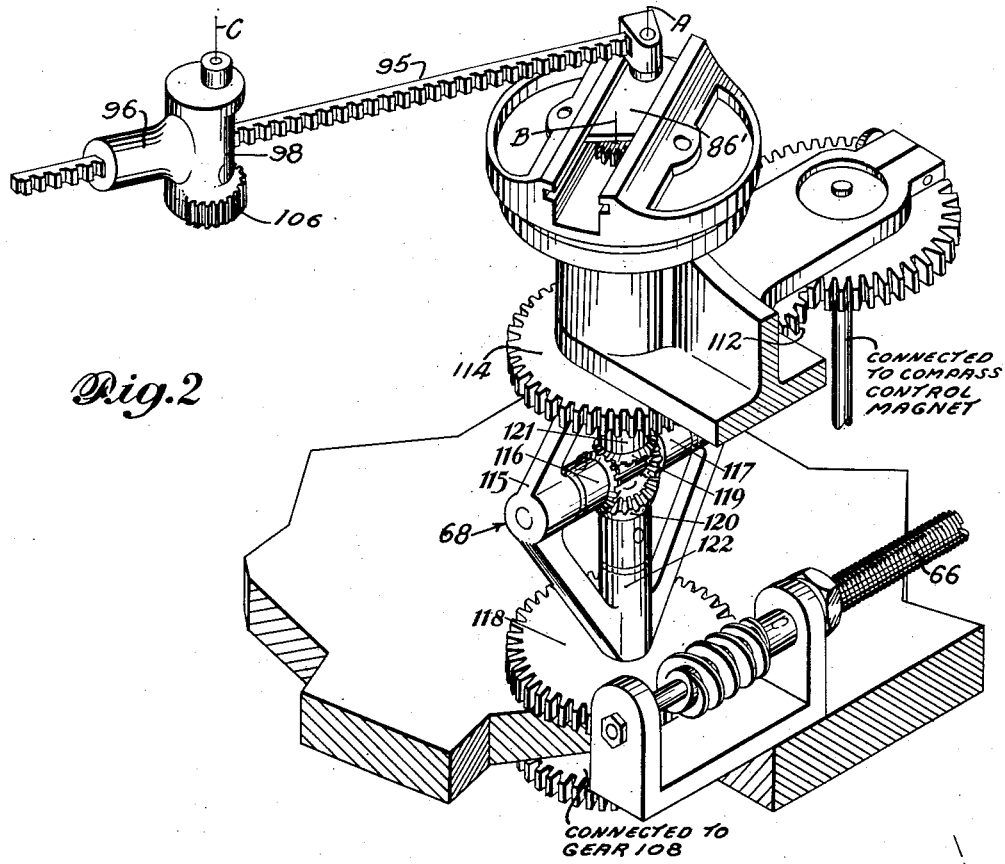
Fig. 2 is a detail of one form of differential mechanism that may be adapted for use in the various places indicated in Fig. 1.

Fig. 2 shows an illustrative form of a differential mechanism which may be adapted for use in the present device to drive the wind vector arm gear and the compass magnet indicated in the diagrammatic showing of Fig. 1. This differential mechanism comprises the spider frame 115 in which the bevel gears 116 and 117 are mounted and at one end of which the gear 118 is fixed for rotation therewith around the same axis around which the bevel gears 119 and 120 rotate in bearings 121 and 122 respectively, formed in the ends of the spider frame 115. The bevel gear 119 has a shaft connected with the output gear 114, whereas the bevel gear 120 has a shaft extending downwardly to the gear 124. Thus the motion of gear 123 is controlled in its position not only by the movement of the gear 124 which may be driven by the output from the differential 64 located between the wheel drives, but also by movement of the gear 118 which may be connected to the gear 108 fixed to the guide on the end of the air speed arm. This differential mechanism may be made in any shape to suit the requirements, as long as it provides for transmitting motion from two different sources of drive, cumulatively, to a driven third point.

While the invention is shown in partially diagrammatic form in Fig. 1, it is obvious that many different forms of constructions in the details of design may be used to obtain the results desired. This invention is therefore not limited to any specific form of its various parts, and its scope is limited only by the appended claims.

Figure 4:
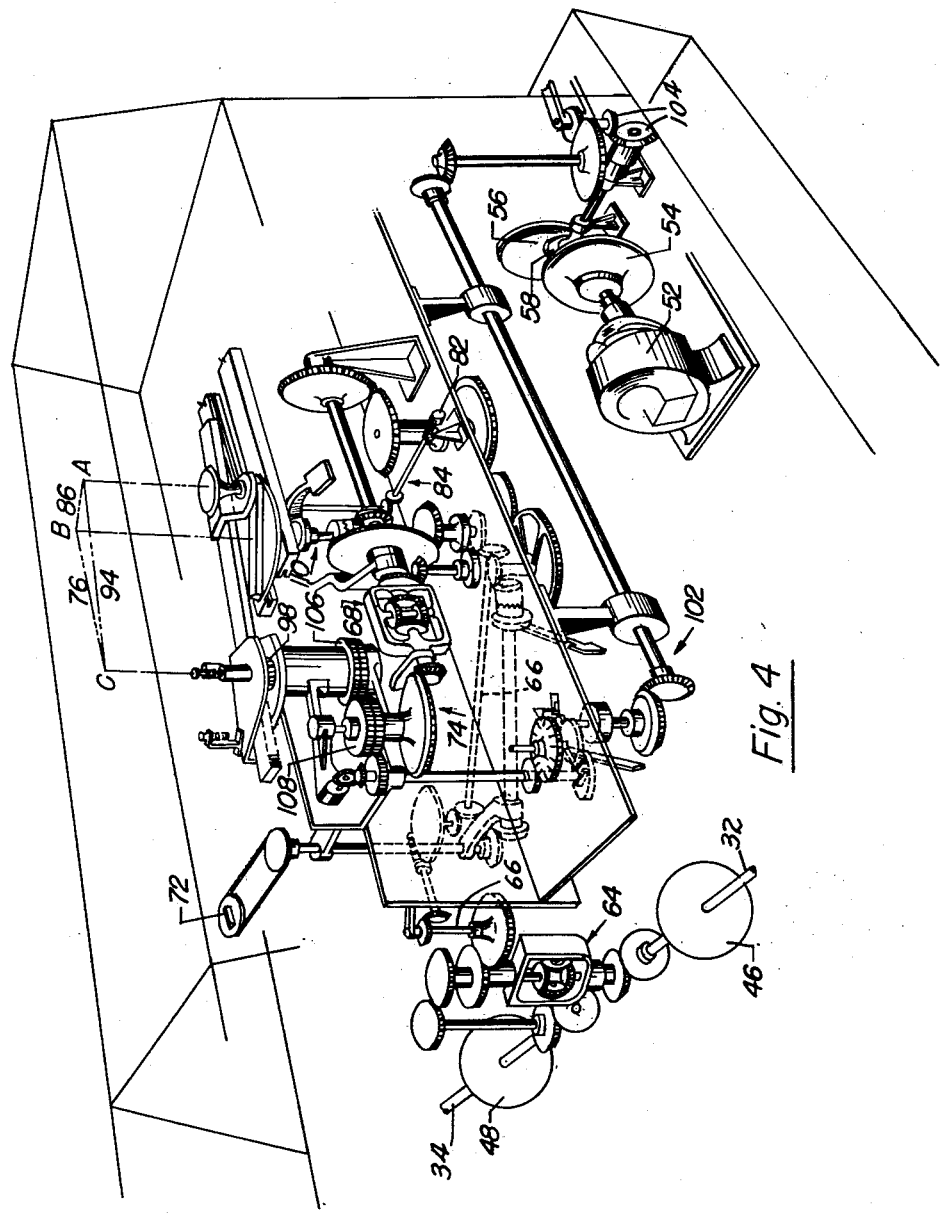
Fig. 4 is a partial perspective view of one embodiment of the mechanism diagrammatically shown in Fig. 1.

One form of assembly of the apparatus built in accordance with the diagrammatic illustration of Fig. 1 is shown partially in Fig. 4 to show the type of gearing arrangements that might be used for the several connections. The corresponding parts are designated by the same numerals as in Fig. 1 to show how the functions of the diagrammatically illustrated parts in Fig. 1 are carried out structurally. Fig. 4 is not complete because the cart shown in partial phantom outline contains much more apparatus than that which is the subject matter of this application.

Also, for purposes of simplification, the drive between disc 56 near the motor 52, and the discs 46 and 48 is omitted, as well as the sprocket drive mechanism leading from the shafts of the discs 46 and 48 to the cart wheels 20 and 22. These drive connections may take any number of different forms in structure, and their illustration is not believed to be necessary to a clear understanding of the present invention.

In Fig. 4 the wind drift triangle formed by the mechanism, as illustrated, is projected to the plane of the top of the cart to show the relative positions of the three sides under the conditions of adjustment shown.

Thus, it may be seen how the cart will follow a simulated ground track and speed while the compass will indicate the simulated airplane heading.

It will be noted that the arrangement of the correction differential mechanism 68 in Fig. 4 is somewhat different than that shown in Fig. 2, but Fig. 2 shows the mechanism in more detail to better illustrate one possible arrangement of a correction differential adaptable for use in the present combination.

The mechanism of Fig. 2 furthermore includes a modified form of wind vector arm which has a radially slidable portion 86' to vary the length of the arm by the operation of a pinion shown at B cooperating with a rack (which is not visible in this figure) integral with the slidable portion 86'. The pinion at axis B may be operated through a central shaft extending through the differential assembly. This arrangement provides for easier setting of the wind vector arm from a remote point to any wind speed the effects of which it might be desired to simulate, in the simulated flight.

Referring to Fig. 1, the variation in the length of the wind vector arm will obviously alter the ground speed vector length which in turn will rotate gear 98 to correspondingly change the speed of movement of the trainer by controlling the relative speed of the disc 56 to change the velocity of travel of the trainer, thus simulating the corresponding change in ground speed. The resulting change in the angle ACB will move gear 108 to operate the differentials 68 and 64 to correspondingly change the course of the trainer in accordance with the new ground track direction caused by the change in wind speed as long as the heading is maintained constant. With any change in heading, of course, the ground track direction would be further corrected thru the change in the angle ACB, and the ground speed would also be further corrected thru the change in the relative direction of the wind vector affecting the length of the ground speed vector arm, which would turn gear 98 and operate the change speed mechanism through bevel gears 104.

Operation of the knob 82 is similar to operating the throttle to increase or decrease the air speed arm CB thereby operating the gear 98 to correspondingly change the ground track arm CA as well the cart velocity through the change speed mechanism at 104. The resultant change in the angle ACB would provide the necessary corrections in the direction of movement of the cart or the heading or both in accordance with the rudder change, if any.

The scale 92 which is integral with the wind speed vector may be set to indicate the wind deviation with respect to the heading, and is made to turn with the compass heading indication.

The invention described herein may be manufactured and used by or for the Government of the United States of America for governmental purposes without the payment of any royalties thereon or therefor.

What is claimed is:

1. A mechanism for introducing the effects of an assumed wind into the motion of a navigational trainer cart having a magnetic compass operated by a rotatable magnet, comprising a differential connection between the drivers of the two driving wheels, a second differential, an adjustable triangular mechanism having one arm adapted to represent the assumed wind direction and velocity and having a fixed pivot at one of its ends and a free pivot at the other, two arms on the other two sides of the triangle, one adapted to represent the air speed and heading vector and slidably mounted through the axis of said fixed pivot, and the other the ground speed and track vector and being connected to the free pivot at one end and being slidable at the other end in a pivoted guide on the air speed arm, a pinion rotatably mounted on said guide and meshing with a rack on said ground speed arm, a variable speed mechanism between the driving motor of said cart and the driving wheels, adjusting means for said variable speed mechanism controlled by movement of said rotatable pinion, a gear fixed to said guide, a gear fixed to the wind direction arm of the triangle at its fixed pivot, and connecting drive means between the output of the first differential and one of the inputs of the second differential, between the gear on the guide and the second input to the second differential and between the output of the second differential and the gear on the wind direction arm of the triangle and the magnet of the magnetic compass.

2. A wind drift mechanism for an air navigational trainer cart having a motor, a tachometer serving as an air speed indicator directly driven thereby, a pair of wheels driven by said motor through an adjustable change-speed device and a magnetic compass controlled by a rotatable magnet, comprising: a mechanically adjustable triangle including a wind vector arm on one side thereof, pivoted at both ends, one of said pivots being stationary and having a gear thereon rigidly connected to said arm, an air speed vector arm slidably adjustable along a fixed axis through said stationary pivot at one end and having a pivoted guide at its other end and a ground speed vector arm pivoted at one end to the movable end of the wind vector arm and slidable through said guide at its other end which has a rack formed thereon, a gear pivotally mounted on said guide and meshing with said rack, and another gear fixed to said guide, manual means for adjusting the air speed vector arm in accordance with the driving motor speed, means for automatically operating the change-speed device in accordance with the length of the ground speed arm by the rotation of the pivoted gear on the guide, differential means between the drives for the two cart-driving wheels for putting out a turning speed proportional to the difference in speed of the two wheels and a second differential means driven from one side by the first differential means and from the other side by the turning movement of the gear fixed to the guide and driving the magnet and the gear on the wind vector arm, these driving connections being such that any angular turn of the cart will produce a corresponding angular change in the compass reading and direction of the wind vector arm with the proper corrections for effects of the variation in the angle subtended by the wind vector in the triangle.

3. In a wind drift mechanism for an air navigational trainer cart, mechanical triangle means for continuously solving a wind drift problem by setting said means for a predetermined assumed wind direction and velocity and for an assumed air speed, a differential mechanism having an output responsive to the change in direction of motion of the cart, another differential having an output responsive to the output of the first differential in combination with the value of the angle subtended by the wind vector in said triangle for controlling the angle of said vector with respect to the air speed vector as well as the compass indication so as to indicate the true airplane heading while the cart moves along the track adapted to represent that which the airplane would follow under the assumed conditions, a change-speed mechanism between the driving motor of the cart and the cart wheel drive, means responsive to the change in length of the ground speed vector in said triangle for adjusting the change-speed mechanism so as to obtain the proper speed of movement of the cart representing the true ground speed of the airplane, and a tachometer connected directly to said motor drive for indicating the assumed air speed.

4. In air navigation training apparatus of the character disclosed, in combination, a movable car having a pair of separately rotatable drive wheels, said car being adapted to have a student navigator seated therein, said car having indicating instruments including an air speed indicator and a magnetically controlled simulating compass, said compass including a movable magnet for controlling the indication thereof, a variable speed driving motor, means connecting said motor to said air speed indicator, variable transmission means having a ratio varying member and driven from said motor, means including a drive shaft driven from said transmission means and a pair of additional variable ratio means connecting said transmission means and said pair of drive wheels, foot pedal means adapted to be operated by the student and operatively connected to said pair of additional variable ratio means for simultaneously varying the ratios thereof in opposite senses thereby to turn said car when the pedal means is operated, differential means operatively connected to said pair of additional variable ratio means, means forming a mechanical wind triangle having three movable arms of adjustable lengths, one of said arms being operatively connected to said differential means and having the position thereof controlled from said differential means, said differential means also controlling the position of said magnet, and means connected to said ratio varying member and to another of said arms and responsive to movement of said last named arm for varying the speed of said drive shaft.

5. In air navigation training apparatus of the character disclosed, in combination, a movable car having a pair of separately rotatable drive wheels, said car being adapted to have a student navigator seated therein, said car having indicating instruments including an air speed indicator and a magnetically controlled simulating compass, said compass including a movable magnet for controlling the indication thereof, a variable speed driving motor, means connecting said motor to said air speed indicator, variable transmission means having a ratio varying member and driven from said motor, means including a drive shaft driven from said transmission means and a pair of additional variable ratio means connecting said transmission means and said pair of drive wheels, means adapted to be operated by the student and operatively connected to said pair of additional variable ratio means for simultaneously varying the ratios thereof in opposite senses thereby to turn said car, differential means operatively connected to said pair of additional variable ratio means, additional differential means having one input thereto corresponding to the output of the first named differential means, means forming a mechanical wind triangle having three movable arms of adjustable lengths, one of said arms being operatively connected to said additional differential means and having the position thereof controlled from said additional differential means, said additional differential means also controlling the position of said magnet, means connected to said ratio varying member and to another of said arms and responsive to movement of said last named arm for varying the speed of said drive shaft, and means coupling the movement of said last named arm to said additional differential means to supply a second input thereto.

6. In air navigation training apparatus of the character disclosed, in combination, a movable car having a pair of separately rotatable drive wheels, said car being adapted to have a student navigator seated therein, said car having indicating instruments including an air speed indicator and a magnetically controlled simulating compass, said compass including a movable magnet for controlling the indication thereof, a variable speed driving motor, means connecting said motor to said air speed indicator, variable transmission means having a ratio varying member and driven from said motor, means including a drive shaft driven from said transmission means and a pair of additional variable ratio means connecting said transmission means and said pair of drive wheels, foot pedal means adapted to be operated by the student and operatively connected to said pair of additional variable ratio means for simultaneously varying the ratios thereof in opposite senses thereby to turn said car when the pedal means is operated, differential means operatively connected to said pair of additional variable ratio means, means forming a mechanical wind triangle having three movable arms of adjustable lengths, one of said arms being operatively connected to said differential means and having the position thereof controlled from said differential means, said differential means also controlling the position of said magnet, another of said arms being manually adjustable in accordance with the air speed, and means connected to said ratio varying member and to the third of said arms and responsive to movement of said last named arm for varying the speed of said drive shaft.

7. Air navigation training apparatus of the character disclosed comprising, in combination, a movable car having a pair of separately rotatable drive wheels, said car being adapted to have a student navigator seated therein, said car having indicating instruments including an air speed indicator and a magnetically controlled simulating compass, said compass including a movable magnet for controlling the indication thereof, a variable speed driving motor, means connecting said motor to said air speed indicator, variable transmission means having a ratio varying member and driven from said motor, means including a drive shaft driven from said transmission means and a pair of additional variable ratio means connecting said transmission means and said pair of drive wheels, means adapted to be operated by the student and operatively connected to said pair of additional variable ratio means for simultaneously varying the ratios thereof in opposite senses thereby to turn said car, differential means operatively connected to said pair of additional variable ratio means, additional differential means having one input thereto corresponding to the output of the first named differential means, means forming a mechanical wind triangle having three movable arms of adjustable lengths, one of said arms being operatively connected to said additional differential means and having the position thereof controlled from said additional differential means, said additional differential means also controlling the position of said magnet, another of said arms being manually adjustable in accordance with the air speed, means connected to said ratio varying member and to the third of said arms and responsive to movement of said third arm for varying the speed of said drive shaft, and means coupling the movement of said last named arm to said additional differential means to supply a second input thereto.

8. In air navigation training apparatus of the character disclosed, in combination, a movable car having a pair of separately rotatable drive wheels, said car being adapted to have a student navigator seated therein, said car having indicating instruments including an air speed indicator and a magnetically controlled simulating compass, said compass including a movable magnet for controlling the indication thereof, a variable speed driving motor, means connecting said motor to said air speed indicator, variable transmission means having a ratio varying member and driven from said motor, means including a drive shaft driven from said transmission means and a pair of additional variable ratio means connecting said transmission means and said pair of drive wheels, foot pedal means adapted to be operated by the student and operatively connected to said pair of additional variable ratio means for simultaneously varying the ratios thereof in opposite senses thereby to turn said car when the pedal means is operated, differential means operatively connected to said pair of additional variable ratio means, means forming a mechanical wind triangle having three movable arms of adjustable lengths, one of said arms being rotatably mounted and having pinion means secured thereto for rotating the same, gear means meshing with said pinion means and operatively connected to said differential means for controlling the position of said last named arm from said differential means, said differential means also controlling the position of said magnet, and means connected to said ratio varying member and to another of said arms and responsive to movement of said last named arm for varying the speed of said drive shaft.

9. In air navigation training apparatus of the character disclosed, in combination, a movable car having a pair of separately rotatable drive wheels, said car being adapted to have a student navigator seated therein, said car having indicating instruments including an air speed indicator and a magnetically controlled simulating compass, said compass including a movable magnet for controlling the indication thereof, a variable speed driving motor, means connecting said motor to said air speed indicator, variable transmission means having a ratio varying member and driven from said motor, means including a drive shaft driven from said transmission means and a pair of additional variable ratio means connecting said transmission means and said pair of drive wheels, means adapted to be operated by the student and operatively connected to said pair of additional variable ratio means for simultaneously varying the ratios thereof in opposite senses thereby to turn said car, differential means operatively connected to said pair of additional variable ratio means, additional differential means having one input thereto corresponding to the output of the first named differential means, means forming a mechanical wind triangle having three movable arms of adjustable lengths, one of said arms being rotatably mounted and having pinion means secured thereto for rotating the same, gear means meshing with said pinion means and operatively connected to said additional differential means for controlling the position of said last named arm from said additional differential means, said additional differential means also controlling the position of said magnet, means connected to said ratio varying member and to another of said arms and responsive to movement of said last named arm for varying the speed of said drive shaft, and means coupling the movement of said last named arm to said additional differential means to supply a second input thereto.

10. In air navigation training apparatus of the character disclosed, in combination, a movable car having a pair of separately rotatable drive wheels, said car being adapted to have a student navigator seated therein, said car having indicating instruments including an air speed indicator and a magnetically controlled simulating compass, said compass including a movable magnet for controlling the indication thereof, a variable speed driving motor, means connecting said motor to said air speed indicator, variable transmission means having a ratio varying member and driven from said motor, means including a drive shaft driven from said transmission means and a pair of additional variable ratio means connecting said transmission means and said pair of drive wheels, foot pedal means adapted to be operated by the student and operatively connected to said pair of additional variable ratio means for simultaneously varying the ratios thereof in opposite senses thereby to turn said car when the pedal means is operated, differential means operatively connected to said pair of additional variable ratio means, means forming a mechanical wind triangle having three movable arms of adjustable lengths, one of said arms being rotatably mounted and having pinion means secured thereto for rotating the same, gear means meshing with said pinion means and operatively connected to said differential means for controlling the position of said last named arm from said differential means, said differential means also controlling the position of said magnet, another of said arms being manually adjustable in accordance with the air speed, and means connected to said ratio varying member and to the third of said arms and responsive to movement of said last named arm for varying the speed of said drive shaft.

LUIS DE FLOREZ.
EDWIN K. SMITH.
GEORGE W. HOOVER.

REFERENCES CITED

The following references are of record in the file of this patent:

UNITED STATES PATENTS

| Number | Name | Date |
|---|---|---|
| 2,301,685 | De Florez | Nov. 10, 1942 |
| 2,312,962 | De Florez | Mar. 2, 1943 |
| 2,326,764 | Crane | Aug. 17, 1943 |
| 2,358,793 | Crane | Sept. 26, 1944 |
| 2,485,301 | Lowkrantz | Oct. 18, 1949 |

FOREIGN PATENTS

| Number | Country | Date |
|---|---|---|
| 561,835 | Great Britain | June 7, 1944 |